July 17, 1962 M. E. SIMMONS ET AL 3,045,137
FRAME AND CORE ASSEMBLY FOR A DYNAMO ELECTRIC MACHINE
Filed Aug. 26, 1957 2 Sheets-Sheet 1
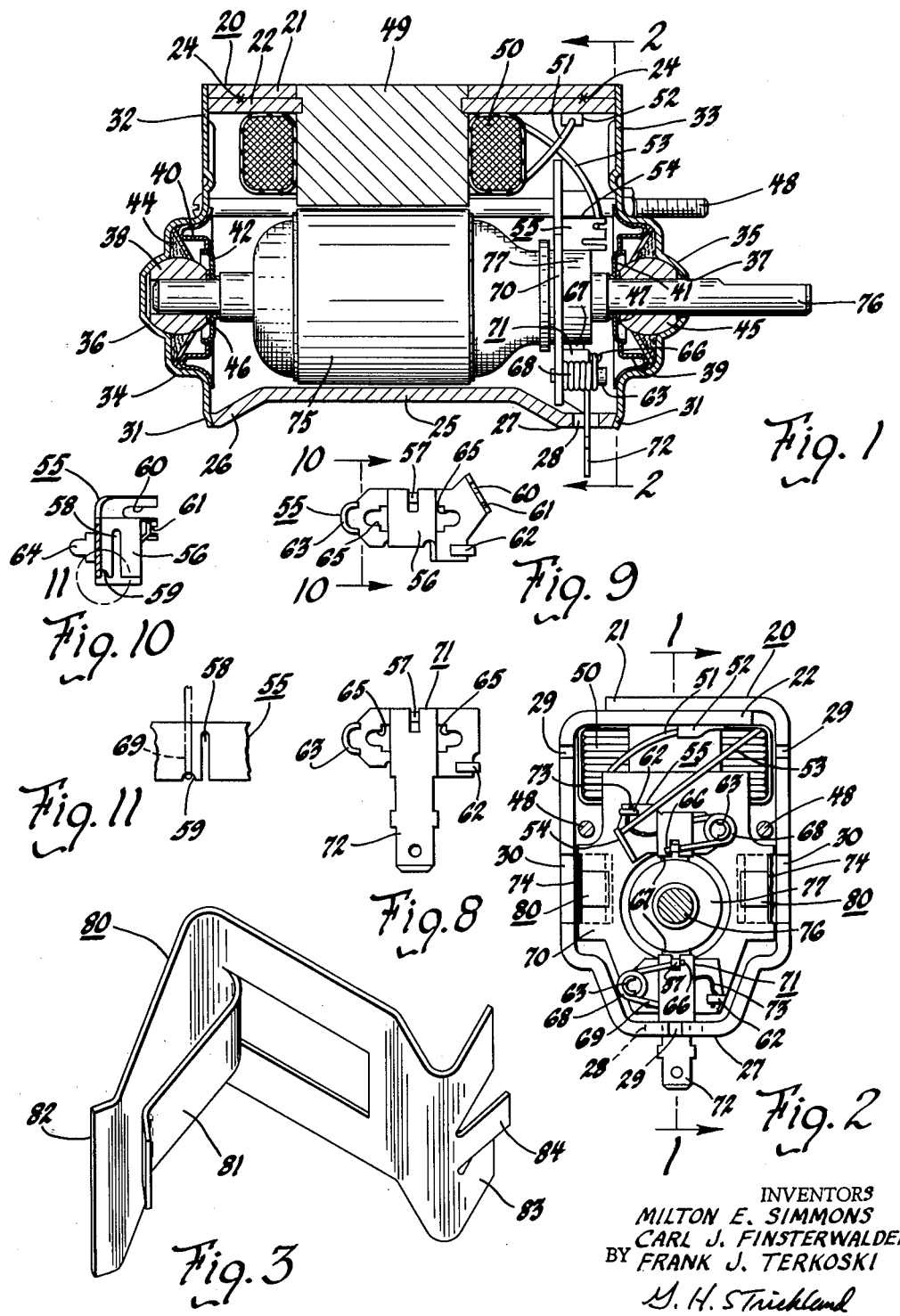
INVENTORS
MILTON E. SIMMONS
CARL J. FINSTERWALDER
BY FRANK J. TERKOSKI
THEIR ATTORNEY July 17, 1962 M. E. SIMMONS ET AL 3,045,137
FRAME AND CORE ASSEMBLY FOR A DYNAMO ELECTRIC MACHINE
Filed Aug. 26, 1957 2 Sheets-Sheet 2
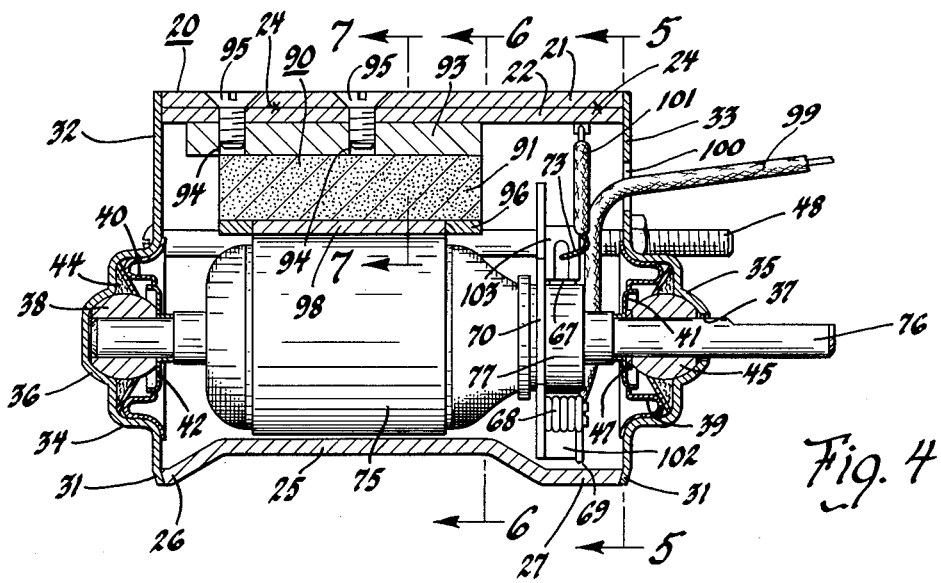
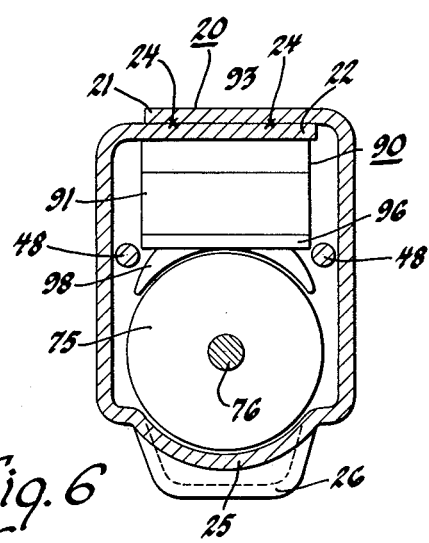
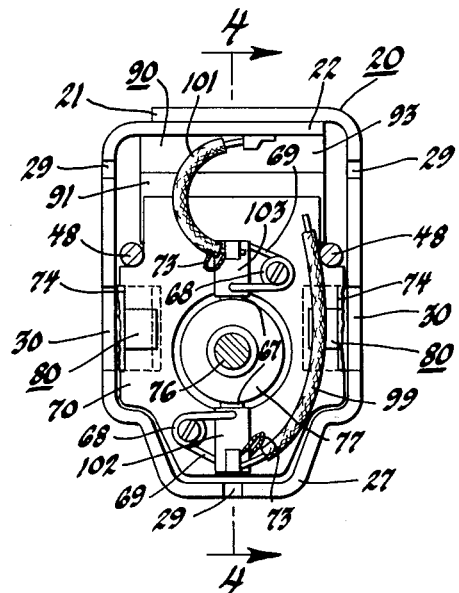
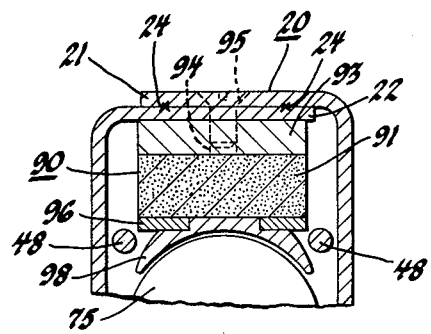
INVENTORS
MILTON E. SIMMONS
CARL J. FINSTERWALDER
BY FRANK J. TERKOSKI
M. H. Strickland
THEIR ATTORNEY

United States Patent Office 3,045,137
Patented July 17, 1962

3,045,137
FRAME AND CORE ASSEMBLY FOR A
DYNAMO ELECTRIC MACHINE
Milton E. Simmons, Carl J. Finsterwalder, and Frank J. Terkoski, Rochester, N.Y., assignors to General Motors Corporation, Detroit, Mich., a corporation of Delaware
Filed Aug. 26, 1957, Ser. No. 680,238
4 Claims. (Cl. 310—258)

This invention pertains to dynamo electric machines, and particularly to small direct current electric motors.

Theretofore, it has been proposed to manufacture a two pole type direct current motor having only a single field pole assembly, such a motor being disclosed in our copending application Serial No. 664,009 filed June 6, 1957. The present invention relates to improved motor assemblies of this type which are more economical to manufacture and more efficient in operation. Accordingly, among our objects are the provision of a dynamo electric machine including a single piece frame member and a unitary pole assembly; the further provision of a motor frame having an intermediate arcuate portion constituting a pole and outwardly bulged end portions; the further provision of a motor of the aforesaid type having a permanent magnet field; the further provision of a motor assembly having end caps retained by tie bolts; the still further provision of a rectangular motor assembly including means for mounting a brush holder assembly therein; and the still further provision of a brush holder designed to facilitate ready assembly and disassembly of a motor armature.

The aforementioned and other objects are accomplished in the present invention by incorporating a single piece frame in a motor of substantially rectangular configuration. Specifically, two embodiments of an improved rectangular electric motor assembly are disclosed herein. The frame end cap assembly of both embodiments are identical, the frame comprising a single piece steel frame member having overlapping end portions which are spot welded together. The side of the frame opposite the overlapped end portions has an intermediate arcuate portion constituting a pole and outwardly bulged end portions designed to accommodate a brush holder assembly and slinger shields.

In one embodiment, a pole piece of sintered iron or drawn steel is suitably attached to the overlapped end portions of the frame, such as by welding, screws, swedging or hot upset. The pole piece is encircled by a field coil which, when energized, magnetizes the pole piece and the frame so that the motor operates as a two pole motor.

In the other embodiment, the pole piece assembly comprises a ceramic disk type permanent magnet which can be made from sintered ceramic material having permanently magnetized metallic powder dispersed therethrough. The pole piece assembly also includes a collector plate, a pole shoe and a spacer of steel. The spacer and collector plate are bonded to the ceramic magnet by a suitable epoxy resin adhesive. The spacer is secured to the overlapped end portions of the frame by a pair of screws.

In both embodiments, an armature is rotatably supported by self-aligning bearings carried by the end caps which are secured to opposite ends of the frame by a pair of tie bolts. The armature, which is of conventional construction, has a commutator which is engaged by a pair of brushes. The brushes are carried by metallic brush holders attached to a phenolic brush holder plate. The brush holder plate is attached to the frame by a pair of metal clips detachably connected to the frame and retained in assembled relation by the commutator end cap.

The brush holders are formed with slots for the lead wires, a hook for the brush pigtail, a spring post and a spring slot for the brush spring. In addition, both brush holders are formed with a notch adapted to support the active end of the brush spring during motor assembly, or disassembly. Moreover, one of the brush holders is formed with an integral spade terminal that extends through a slot in the frame.

Further objects and advantages of the present invention will be apparent from the following description, reference being had to the accompanying drawings, wherein preferred embodiments of the present invention are clearly shown.

In the drawings:

FIGURE 1 is a longitudinal sectional view taken along line 1—1 of FIGURE 2 of an electric motor constructed according to one embodiment of this invention.

FIGURE 2 is a view, partly in section and partly in elevation, taken along line 2—2 of FIGURE 1.

FIGURE 3 is an enlarged view in perspective of a brush holder clip constructed according to this invention.

FIGURE 4 is a longitudinal sectional view of an electric motor constructed according to a second embodiment of this invention, taken along line 4—4 of FIGURE 5.

FIGURE 5 is a view, partly in section and partly in elevation, taken along line 5—5 of FIGURE 4.

FIGURES 6 and 7 are sectional views taken along lines 6—6 and 7—7, respectively, of FIGURE 4.

FIGURE 8 is a view in elevation of a combined brush holder and terminal constructed according to this invention.

FIGURE 9 is a view in elevation of a brush holder constructed according to this invention.

FIGURE 10 is a sectional view taken along line 10—10 of FIGURE 9.

FIGURE 11 is an enlarged view taken in the area of circle 11 of FIGURE 10 before forming the channel shaped brush guide.

With particular reference to FIGURES 1 and 2, in one embodiment the motor comprises a steel frame 20 which, as shown in FIGURE 2, is of substantially rectangular configuration with overlapping end portions 21 and 22. The overlapping end portions 21 and 22 are maintained in assembled relation by a plurality of spot welds such as indicated by numeral 24. The side of the frame 20 opposite the overlapped end portions 21 and 22 has its intermediate portion 25 of arcuate configuration as shown in FIGURE 6, while the end portions 26 and 27 are bulged outwardly to accommodate the brush holder assembly and slinger shields, to be described. In addition, the outwardly bulged portion 27 has an opening 28 therethrough, the purpose of which will likewise be described hereinafter.

Each end of the frame 20 has formed thereon three locating notches 29. In addition, the commutator end of the frame has formed therein two brush clip notches such as indicated by numeral 30 in FIGURE 5. The end cap locating notches 29 are adapted to receive tangs, or projections 31, formed around the periphery of end caps 32 and 33 for properly locating the end caps relative to the frame 20. The end cap 32 is formed with an integral depression 34 having a spherical surface 36 for supporting a self-aligning bearing 38. The end cap 32 also has attached thereto a slinger shield 40 which supports a resilient bearing retainer 42, a lubricated felt packing 44 being interposed between the bearing retainer and the end cap 32. One or more thrust washers 46 are interposed between the slinger shield 44 and the self-aligning bearing 38.

The commutator end cap 33 is likewise formed with an integral depression having a spherical surface 35 having a central opening 37 for accommodating the armature shaft. In addition, the commutator end cap assembly 33 includes a slinger shield 39 attached thereto which supports a resilient bearing retainer 41, a lubricated felt packing being disposed between the retainer 41 and the spherical depression 35. A self-aligning bearing 45 is disposed between the spherical depression 35 and one or more thrust washers 47.

The end caps 32 and 33 are held in assembled relation with the frame 20 by a pair of tie bolts 48 as shown in FIGURES 1 and 2. In the first embodiment, a pole piece composed of drawn steel 49 is secured in assembled relation with the frame 20 by means of a hot upset. The pole piece 49 includes a pole body and a pole shoe, not shown, of arcuate configuration, the pole body being encircled by a field coil 50. One lead wire 51 of the field coil is soldered, or welded, to the frame 20 as indicated by numeral 52. The other lead wire 53 of the field coil, which is a series field coil, is soldered, or welded, to a terminal post 54 of a brush holder 55.

Referring to FIGURES 9 through 11, the brush holder 55 is composed of an integral piece of sheet metal, such as brass, the intermediate portion of which is formed as a channel 56 constituting a brush guide. The outer wall of the channel 56 as shown in FIGURE 9 has an upstruck tang 57, and one side of the channel 56 has an elongated slot 58 and a notch 59. The terminal portion 54 is formed with slots 60 and 61. In addition, the brush holder includes a hook 62 to which the brush pigtail is soldered, or welded, and an integral brush spring supporting post 63. The back wall of the channel 56 is open, and tangs, such as indicated by numeral 64, are pressed out of the brush holder forming openings 65, the tangs 64 being employed to attach the brush holder to a brush holder plate 70 of insulating material. Thus, the brush holder 55 is secured to the plate 70 by inserting the tangs 64 through slots thereof and then deforming the tangs, and in this manner the brush holder 55 forms three sides of the brush guide while the brush plate 70 forms the remaining side.

As shown in FIGURE 8, the brush holder 71 differs from the brush holder 55 in that the terminal portion 54 is eliminated and the front wall of the channel 56 is extended to form a spade terminal 72. In all other respects the brush holders 55 and 71 are identical.

Each brush holder supports a brush 67, and each post 63 is encircled by the intermediate convolutions of a torsion spring 68. One end 66 of each brush spring 68 is retained in fixed position beneath tang 57, while the other end 69, the active end, is adapted to be inserted through the slot 58 so as to urge its respective brush 67 into engagement with the commutator of the armature.

As shown in FIGURE 1, the motor includes a wound armature 75 of conventional construction having a shaft 76, one end of which is supported by a bearing 38, and the other end of which extends through and is rotatably supported by the bearing 45. The armature includes a commutator 77 which is engaged by the brushes 67. During assembly and disassembly of the armature from the frame 20, the ends 69 of the torsion springs 68 are moved from the slots 58 and into the notches 59 as diagrammatically indicated in FIGURE 11 thereby relieving the brushes of spring pressure and enabling the armature to be readily assembled and disassembled with the frame. This constitutes an important feature of the present invention and greatly reduces the assembly and disassembly time, since heretofore, it has always been necessary to use some tool to push the brushes back into their brush guides when an armature is assembled with the motor frame. The brushes 67 are connected by pigtails 73 to the hooks 62 of the brush holders.

The spade terminal 72 extends through the opening 28 in the frame 20 and is adapted to be connected to one terminal of a battery. The other terminal of the battery is connected to ground, as is the frame 20 of the motor, whereby only a single lead is required from the battery to the motor. Moreover, by making the terminal 72 integral with the brush holder 71, a saving is realized in both labor and material since it has heretofore been the practice to connect the brush holder by a wire to a separate terminal as shown in the aforementioned copending application Serial No. 664,009.

The brush holder plate 70, which is of substantially rectangular configuration, is supported in assembled relation with the frame 20 by a pair of spring clips 80. With reference to FIGURE 3, each spring clip 80 comprises a piece of sheet metal having an upstruck portion 81 which together with end 82 forms a pair of spring fingers which are received by a notch 74 in the brush holder plate 70. The end of the clip 80 is flanged as indicated by numeral 83 and is formed with a resilient upstruck tang 84, the flanged end 83 being received in the notch 30 of the frame. When the commutator end cap 33 is assembled with the frame by the tie bolts 48, the clips 80 are securely retained in position by deformation of the tangs 84, while the spring fingers 81 and 82 support the brush holder plate 70.

With reference to FIGURES 4 through 7, a modified motor assembly is shown, similar numerals depicting similar parts throughout the several views. In the modified embodiment the frame 20 and end cap assemblies 32 and 33 and the armature 75 are substantially identical with similar components in the first embodiment, except as noted hereinafter. In the modified embodiment, the pole piece assembly is designated generally by numeral 90 and comprises a permanent disk type magnet 91 composed of sintered ceramic material having permanently magnetized metallic powder dispersed therethrough. A spacer 93 of steel is secured to one side of the disk magnet 91 by an epoxy resin adhesive. The spacer 93 has a pair of tapped holes 94 therein for receiving screws 95 by which means the pole piece assembly 90 is secured in assembled relation with the frame 20. In addition, a collector plate 96 of steel is bonded to the other side of the disk magnet 91, the collector plate 96 having a rectangular opening 97 therein within which a steel pole shoe 98 is press fitted.

Thus, in the second embodiment of the motor assembly, the motor includes a permanent magnet field. The brush holder plate 70 is identical to the brush holder plate. However, the brush holders are different. As shown, a brush holder 102 has a lead wire 99 secured thereto which extends through an opening 100 in the commutator end cap 33. Moreover, a brush holder 103 is connected by a wire 101 to the frame 20. The wire 99 is connected to one terminal of the battery, the other terminal being connected to ground as is the frame 20 so that upon energization of the armature winding, the armature 75 will rotate. In both embodiments, the arcuate portion 25 opposite overlapped ends 21 and 22 constitutes a pole which is magnetized from the pole piece assembly secured to the overlapped end portions.

From the foregoing it is readily apparent that the present invention provides a rectangular motor assembly which is readily adapted to mass production since it can be readily assembled and disassembled.

While the embodiments of the present invention as herein disclosed constitute preferred forms, it is to be understood that other forms might be adopted.

What is claimed is as follows:

1. In a dynamo electric machine, a sheet metal frame of substantially rectangular configuration, one side of said frame having an intermediate portion of arcuate configuration constituting a pole and outwardly bulged end portions, a pole piece secured to the opposite side of said frame, a field coil encompassing a portion of said pole piece and having one end connected to said frame, a pair of end caps secured to opposite ends of said frame, a wound armature rotatably supported by said end caps and having a commutator, a brush holder assembly disposed within said frame in alignment with one of said outwardly bulged end portions including a pair of brushes engageable with said commutator, said brush holder assembly being retained in assembled relation with said frame by the securement of one of said end caps to one end of said frame, and means electrically connecting one of said brushes and one end of said field coil whereby energization of said field coil will result in magnetization of said pole piece and said frame.

2. The dynamo electric machine set forth in claim 1 wherein said brush holder assembly comprises a plate of insulating material having a substantially rectangular configuration, and wherein said plate is secured to said frame by a pair of clips.

3. The dynamo electric machine set forth in claim 2 wherein the commutator end of said frame has a pair of notches formed therein, and wherein said clips have portions disposed within said notches and retained in assembled relation by said one of said end caps.

4. In a dynamo electric machine, a sheet metal frame of substantially rectangular configuration, one side of said frame having an intermediate portion of arcuate configuration constituting a pole and outwardly bulged end portions, a pole piece secured to the opposite side of said frame, a pair of end caps secured to opposite ends of said frame, a wound armature rotatably supported by said end caps and having a commutator, the outer edges of said frame having a plurality of locating notches therein, said end caps having projections disposed in said notches, and a brush holder assembly disposed within said frame in alingment with one of said outwardly bulged end portions including a pair of brushes engaging said commutator, said brush holder assembly being retained in assembled relation with said frame by the securement of one of said end caps to one end of said frame.

References Cited in the file of this patent

UNITED STATES PATENTS

| | | |
|---|---|---|
| 1,557,000 | Kuhls | Oct. 13, 1925 |
| 1,618,877 | Henry | Feb. 22, 1927 |
| 1,935,789 | Cullin | Nov. 21, 1933 |
| 2,062,938 | Ruppe | Dec. 1, 1936 |
| 2,324,299 | Haifley et al. | July 13, 1943 |
| 2,679,607 | Potter | May 25, 1954 |
| 2,736,829 | Sills | Feb. 28, 1956 |
| 2,745,031 | Rimkus | May 8, 1956 |
| 2,780,744 | Carneck | Feb. 5, 1957 |
| 2,944,169 | Schmidt | July 5, 1960 |

FOREIGN PATENTS

| | | |
|---|---|---|
| 329,905 | Great Britain | May 29, 1930 |
| 432,786 | Great Britain | Aug. 1, 1935 |
| 553,847 | Italy | Jan. 3, 1957 |
| 603,604 | Germany | Oct. 6, 1934 |
| 645,077 | France | June 25, 1928 |